(12) United States Patent
Fribourg et al.

(10) Patent No.: US 10,132,177 B2
(45) Date of Patent: Nov. 20, 2018

(54) HOLLOW VANE, AND ASSOCIATED PRODUCTION METHOD

(71) Applicant: SAFRAN AIRCRAFT ENGINES, Paris (FR)

(72) Inventors: Guillaume Fribourg, Puteaux (FR); Pierre Delaleau, La Garenne Colombes (FR); Florian Tellier, Yerres (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 304 days.

(21) Appl. No.: 14/893,332

(22) PCT Filed: May 28, 2014

(86) PCT No.: PCT/FR2014/051273
§ 371 (c)(1),
(2) Date: Nov. 23, 2015

(87) PCT Pub. No.: WO2014/191691
PCT Pub. Date: Dec. 4, 2014

(65) Prior Publication Data
US 2016/0123167 A1   May 5, 2016

(30) Foreign Application Priority Data

May 28, 2013 (FR) ...................... 13 54805

(51) Int. Cl.
*F01D 9/04* (2006.01)
*B23P 11/02* (2006.01)
(Continued)

(52) U.S. Cl.
CPC ............ *F01D 9/041* (2013.01); *B23P 11/025* (2013.01); *B23P 15/04* (2013.01); *F01D 5/147* (2013.01);
(Continued)

(58) Field of Classification Search
None
See application file for complete search history.

(56) References Cited

U.S. PATENT DOCUMENTS 7,329,087 B2 * 2/2008 Cairo ............... F01D 5/147
415/135
8,511,991 B2 * 8/2013 Hunt ............... B23P 15/04
29/889.72
(Continued)

FOREIGN PATENT DOCUMENTS

| EP | 1 760 266 A2 | 3/2007 |
| FR | 2 956 875 A1 | 9/2011 |
| FR | 2 978 196 A1 | 1/2013 |

OTHER PUBLICATIONS

International Search Report dated Jul. 21, 2014 in PCT/FR2014/051273 filed May 28, 2014.
(Continued)

*Primary Examiner* — David E Sosnowski
*Assistant Examiner* — Juan G Flores
(74) *Attorney, Agent, or Firm* — Oblon, McClelland, Maier & Neustadt, L.L.P.

(57) ABSTRACT

A hollow vane, includes a main portion, of which the cavity is closed by a cover, that is produced by expanding the main portion relative to the cover, for example by means of differential thermal expansion, then by placing the cover at the bottom of the opening of the cavity, before allowing the main portion to close again, closing a nesting between a protrusion at the bottom of the cover and a widening at the bottom of the opening. The disadvantages linked to the use of welding, glue or even assembly parts are as such avoided.

11 Claims, 6 Drawing Sheets

(51) Int. Cl.
*B23P 15/04* (2006.01)
*F01D 5/14* (2006.01)
*F16B 4/00* (2006.01)

(52) U.S. Cl.
CPC ...... *F05D 2230/60* (2013.01); *F05D 2240/12* (2013.01); *F05D 2300/43* (2013.01); *F05D 2300/502* (2013.01); *F16B 4/008* (2013.01)

(56) References Cited

U.S. PATENT DOCUMENTS

| | | | |
|---|---|---|---|
| 8,616,834 B2* | 12/2013 | Knight, III | F01D 5/18 415/116 |
| 2007/0048135 A1 | 3/2007 | Pietraszkiewicz et al. | |
| 2011/0135483 A1* | 6/2011 | Hunt | B23P 15/04 416/223 R |
| 2011/0268562 A1* | 11/2011 | Knight, III | F01D 5/18 415/179 |
| 2013/0287587 A1 | 10/2013 | Hunt et al. | |
| 2014/0193250 A1 | 7/2014 | Papin et al. | |

OTHER PUBLICATIONS

French Search Report dated Sep. 9, 2013 in FR Application 1354805 filed May 28, 2013.

* cited by examiner

HOLLOW VANE, AND ASSOCIATED PRODUCTION METHOD

BACKGROUND OF THE INVENTION

Field of the Invention

The subject of this invention is a hollow vane, as well as its associated production method.

The vane in question can be an OGV (Outlet Guide Vane), i.e. a fixed vane of a rectifier of the flow of the gases, downstream of a stage of mobile vanes belonging to the rotor of a turbomachine, without other types of vanes being excluded.

Description of the Related Art

Vanes can be solid, or on the contrary hollow when it is desired to reduce their weight. They then comprise an internal cavity and are often built in two portions: a main portion that encompasses the cavity, comprising an open face in order to make it possible to access the cavity, and to produce it via machining, and a cover that is assembled to the main portion, in such a way as to close the opening and to form a smooth and continuous external face, required for correct aerodynamic operation of the vane. Documents FR 2 956 875 A and FR 2 978 196 A can be mentioned to show certain known designs of hollow vanes.

The conventional modes for assembly between the cover and the main portion are welding and gluing. However these two modes for assembly both have certain disadvantages: the welding is accompanied by a mechanical reduction on the welded joint relative to the properties of the base material of the vane, residual constraints and deformations in the vane, and entails expensive machining operations in order to rectify the shape of the external face; and the gluing can have an uncertain resistance over long periods of time, is rather subject to the propagation of cracks, as soon as they appear, as to the attack of certain chemical agents, and often imposes extra material in order to guarantee the junction of the parts over the entire edge, which exceeds the joint and which must be removed after the hardening in order to recover the smooth external face that is indispensable for a vane. Inspections concerning the quality of the assembly are required, and the replacing of the cover during maintenance campaigns is difficult or impossible. This is why an improvement in the assembly was sought. It forms the subject of the invention.

BRIEF SUMMARY OF THE INVENTION

The latter relates to, according to a general aspect, a hollow vane comprising a main portion and at least one cover, with the cover being mounted in an opening of the main portion in such a way as to close the opening and to form with the main portion an external, substantially continuous face of the vane, the main portion further comprising a cavity that communicates at the external face through the opening, characterised in that the cover comprises at least one protrusion, extending over a portion of a thickness of the cover at a distance from the external face and over opposite portions of the edge of the cover, and the main portion comprises at least one widening of the opening, located at a distance from the external face and wherein the protrusion of cover penetrates.

The adjustment is as such done via a simple nesting of shapes, without any welding or gluing being required. A gluing can however be carried out without any inconvenience in order to perfect the connection if necessary. The protrusions of the cover, retained in the widenings of the opening, prevent the extraction or the falling of the cover subsequently, during the operation of the part. The adjustment can be very precise. It must also be underlines that, as shall be addressed further on, the method for producing or for assembling such a vane is very simple and does not entail any damage to the cover or to the main portion, with in particular no plastic deformation occurring.

According to various improvements which shall now be enumerated, the cover can be mounted without clearance in the opening of the main portion, between the protrusion and the external face, and the protrusion is housed in the widening with clearance. The external face of the vane is then smooth and continuous. The clamping constraints that are then exerted at the junction of the cover and of the main portion are, advantageously, purely elastic.

The cover can be attached to the main portion without any intermediate connection material, which simplifies the structure of the vane and it production, while still making it possible to prevent the risks of ageing that are inherent with some of these materials.

The protrusion and the widening can extends either over entire edges of the opening and of the cover, or only over portions that can be superimposed of these edges: this is per se indifferent to the proper execution of the invention, provided that the nesting of the protrusions of the cover in the widenings of the opening is enough to prevent the extraction.

The opening can form a rebate comprising a bearing surface of a bottom face, opposite the external face, of the cover: the bearing of the cover makes it possible to displace it a determined penetration in the opening, where its external face is exactly flush with the external face of the main portion.

Hollow vanes are often provided with ribs that divide the internal cavity. With the invention, it is possible to extend the ribs to the external face of the main portion, by also having them divide the opening, and a cover such as defined hereinabove is then installed on each one of the portions of the opening. A better rigidity of the vane, with regards to vibrations for example, can then be hoped for, thanks to the decrease in the surface area of the covers. As the assembly of the cover or covers to the main portion can be accomplished very easily, the presence of a plurality of covers is not a problem.

The connection surface between the main portion and the cover can be smooth after the mounting of the cover, but this is not always sought, and in a design that is also as valid, the protrusion and the widening extend in front of the leading and trailing edges of the vane, the cover protruding outside of the main portion in front of the leading edge and entering into the main portion in front of the leading edge, by means of a decreasing thickness from the cover from the leading edge to the trailing edge, or by a decreasing depth of the widening from the leading edge to the trailing edge.

The protrusion and the widening can be constituted by degrees in the variation of the section, or by oblique edges that as such give them continuously enlarging sections in front of the external face of the vane.

The slopes of such oblique edges are advantageously low, from 5° at most for example, of an angle with a direction perpendicular to the external face of the vane. The angles can be different for the main portion and the cover, in order to encourage a trapping of the cover when it has been installed.

The method of manufacture of such a vane can be carried out by establishing a dilatation of the main portion relative to the cover. It is sufficient for this dilatation to be sufficient to allow the opening to be passed through by the protrusions with a clearance, then to place the protrusions opposite the widenings. The dilatation is then allowed to be interrupted, in such a way that the main portion retracts over the cover and the widenings adjust around the protrusions. The assembling is then terminated.

The dilatation can be accomplished via mechanical means, or, preferably, by establishing a difference in temperature between the main portion and the cover, by cooling the latter and/or by heating the latter. Rather moderate differences in temperatures (a few hundred degrees) can be sufficient, provided that the vanes are constructed from an alloy with a high coefficient of expansion, such as aluminium, or titanium, alloys.

An elastic folding, or a moulding of the cover in the hollow of the main portion, can also be carried out for this result.

BRIEF DESCRIPTION OF THE SEVERAL VIEWS OF THE DRAWINGS

The invention shall now be described in detail by means of the following Figures, which show the embodiments of it considered and not exclusive of others.

DETAILED DESCRIPTION OF THE INVENTION

Figure 1:
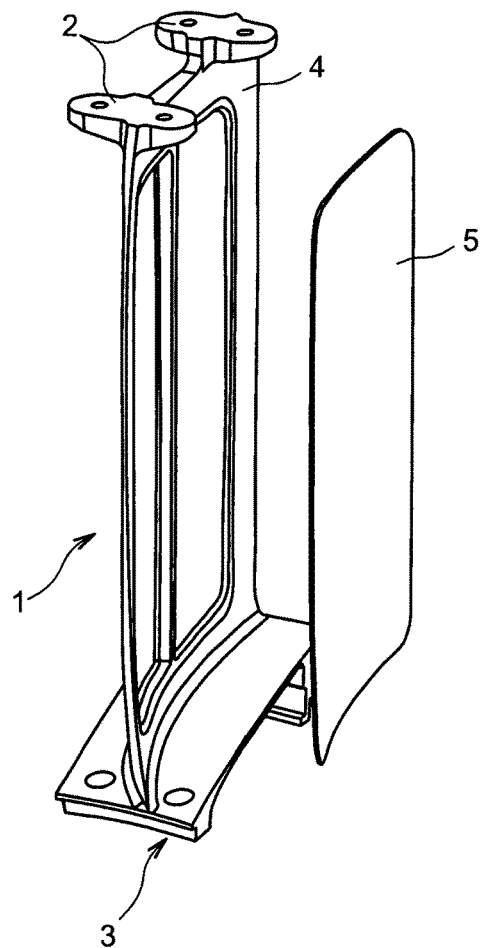
FIG. 1 shows a hollow vane.

A diagrammatical realisation of a hollow vane is shown in FIG. 1. It shows a main portion 1, provided with attachment tabs 2 to a stator not shown of a rotating machine to a head portion and other attachment tabs 3 to a connection ring, also conventional, of a circular stage of such vanes, to a foot portion. The main portion 1 comprises an internal cavity 4 opening to a main intrados or extrados face. The vane further comprises a cover 5, able to close the opening of the cavity 4 by adjusting on it.

Figure 2:
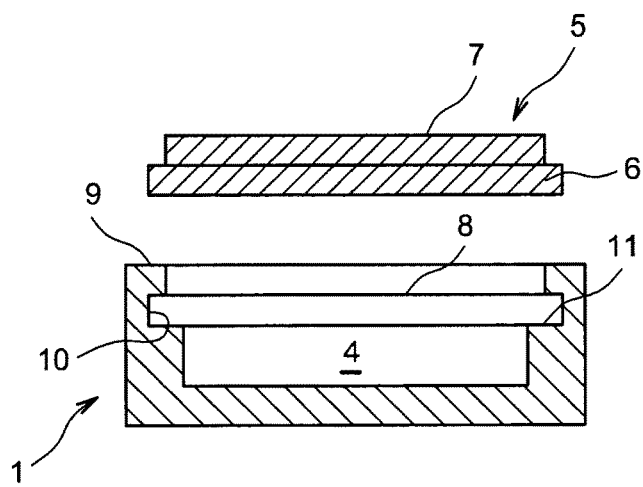
FIG. 2, the cross-section of a hollow vane, in accordance with the invention, before its assembly.

FIG. 2 shall now be addressed. The cover 5 is here a flat or substantially flat plate of a constant thickness (a non-flat cover can also be considered without leaving the scope of the invention), of which the edge carries a protrusion 6 at a distance from an external face 7 of the cover 5. The protrusion 6 extends however to a bottom face, opposite the external face 7, of the cover 5. The opening 8 of the main portion 1, leading from the external face 9 of the latter to the cavity 4, comprises a widening 10 at a distance from the external face 9, and which is limited in the direction of the cavity 4 by a bearing surface 11 directed towards the exterior of the main portion, with the opening 8 being as such in the form of a rebate.

Figure 3:
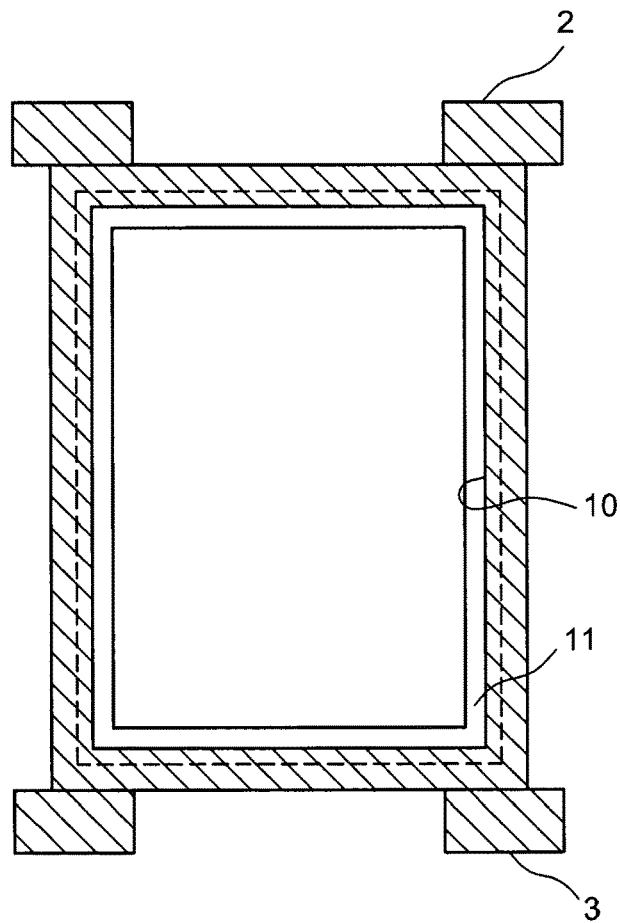
FIG. 3, a front view of the main portion of this vane.

FIG. 3 shows that the widening 10 extends over the entire edge of the opening 8, and that the protrusion 6 also extends over the entire edge of the cover 5. Protrusions and widenings extending over a few portions of the edge could however suffice. The number of protrusions and widenings, their positions over the edge and their extent are then not critical: very few and narrow protrusions can suffice. It should simply, if the protrusion 6 is not continuous over the edge of the cover, extend over opposite portions of the edge in order to prevent it from being extracted via rotation.

Figure 4:
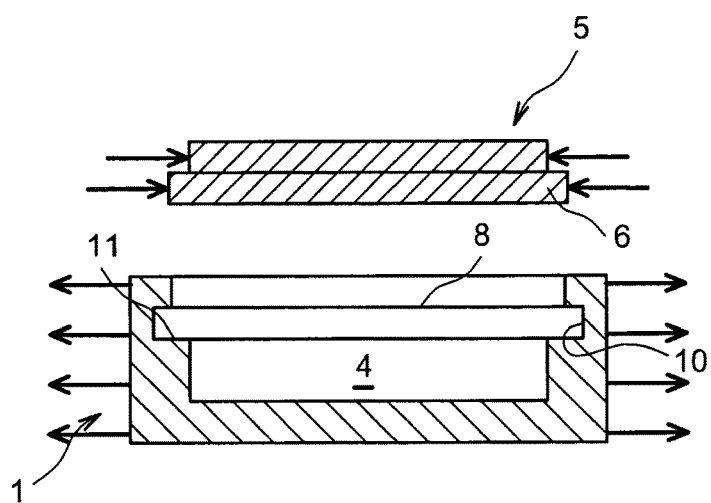
FIGS. 4, 5 and 6, the mains steps of the assembly.
Figure 5:
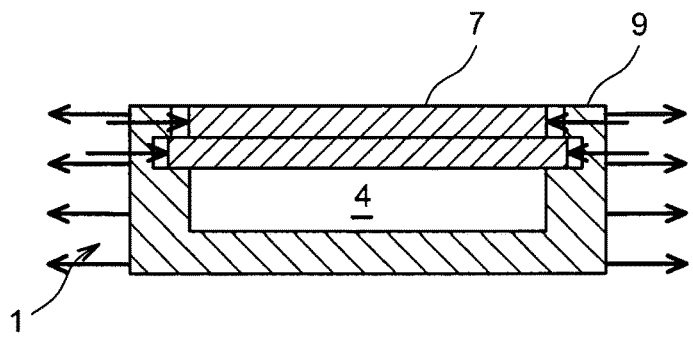
Figure 6:
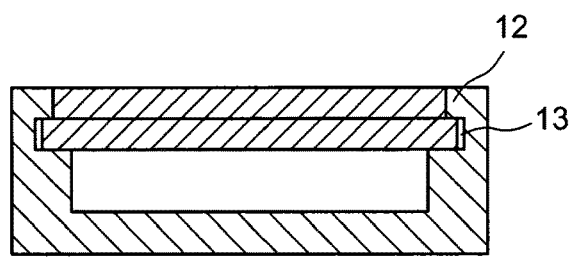

Comments shall be made now on FIG. 4 in order to show a method for assembling the vane. A dilatation of the opening 8 is produced, relative to the cover 5. It is possible to proceed by heating the main portion 4, by cooling on the contrary the cover 5, or both. The heating can be carried out in an oven, and the thermal contraction, via immersion in a cold liquid nitrogen bath, for example. A mechanical stretching of the main portion 4 can also be carried out, by pulling on the four sides thereof, after having clamped them in a machine with jaws. In the state reached, the widest section of the cover 5, corresponding to the protrusions 6, is narrower than all of the portions of the opening 8, in such a way that it is sufficient to lower the cover 5 into the opening 8 and to place it on the bearing surface 11 in order to carry out the assembly. This state is shown in FIG. 5. As the distance between the external face 9 and the bottom face 11 of the main portion 4 is equal to the thickness of the cover 5, the external faces 7 and 9 are aligned and the protrusion 6, located at the bottom of the cover 5, is located at the same level as the widening 10 at the bottom of the opening, and surrounded by it. The dilatation of the opening 8 is released and decreases little by little, in such a way that the widening 10 retracts around the protrusion 6. The final state is that of FIG. 6, wherein the protrusion 6 is entered into the recess 10, by being retained, in the direction of the external face 9, by the overhanging portion 12 of the edge of the opening 8. A slight clamped adjustment is produced between the external portion of the cover 5 and the internal radial edge of the overhanging portion 12, in such a way that the external faces 7 and 9 are as an extension and form a single and continuous external face. A clearance 13 subsists on the contrary at the bottom of the widening 10 and around the protrusion 6, in order to prevent concentrations of unnecessary constraints. The vane then forms a unit assembly, despite the absence of the means of assembly. The thickness of the protrusion 6 being identical to that of the widening 10, the movements of the cover 5 in the opening 8, as penetration or as extraction, are also stopped, and the external faces 7 and 9 rest as an extension. No additional treatment or any inspection is required.

If the cover 5 undergoes a degradation in service (impact, crack, scratch, etc.) which renders the vane improper for its use and imposes that it be repaired or replaced, the mode of assembly that characterises the invention makes it possible to replace only the cover 5 after having removed it via machining, and to retain the main portion 1 of the vane without degrading it.

Figure 7:
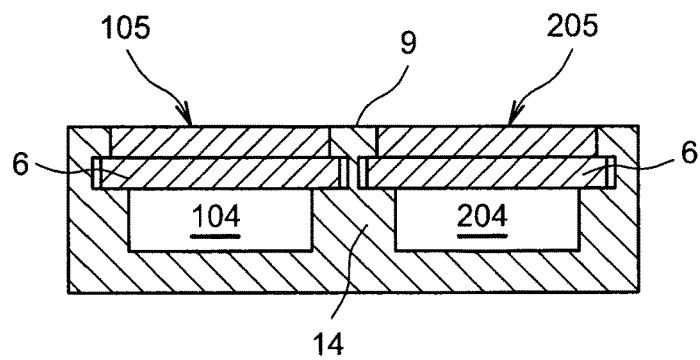
FIG. 7, an alternative embodiment.

FIG. 7 shows an alternative embodiment. A rib 14 divides the cavity 4 into two portions 104 and 204 and the opening also into two portions, as it extends to the external face 9. The portions of the opening are then closed by two covers 105 and 205 respectively, which are similar to the covers 5, if only by their external dimensions; they are in particular assembled in the same manner, via a nesting of the protrusions 6 in widenings 10, arranged in the portions of opening over the cavities 104 and 204. The ribs 14 can be of any number, as well as the covers such as 105 and 205.

Figure 8:
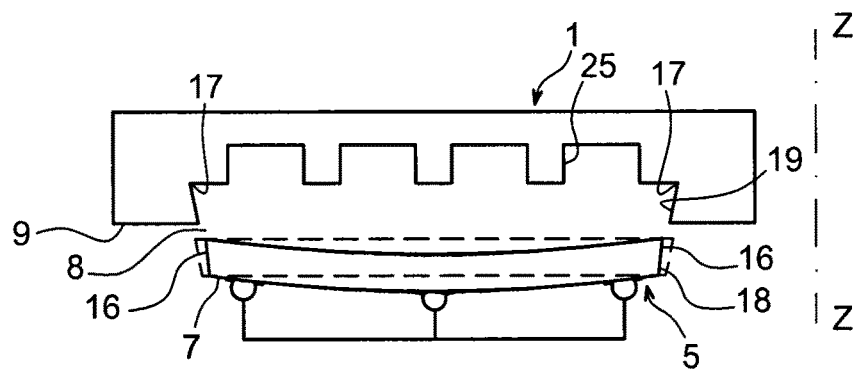
FIG. 8, an alternative embodiment, and another method of assembly of the vane.

The invention can further be applied with a multitude of other alternatives of which details shall be provided on some of them. FIG. 8 shows as such that the protrusion and the widening are not necessarily in the shape of a collar and of rebate as has been described until now, but that they can also be bevelled: the protrusion, now 16, and the widening of the opening 8, now 17, are formed by oblique edges 18 and 19 in such a way that their sections widen continuously as they move away from the external faces 7 and 9. Their shape is roughly conical. As hereinabove, the opening 8 is narrower at the external face 9 than the cover 5 at its widest portion, separated from the external face 7, which prevents both a direct introduction of the cover 5 into the widening 17 and its extraction once it has been placed therein. FIG. 8 further shows that another method of assembling the cover 5 to the main portion 1 is possible: the cover 5 can be deformed in the elastic range of its material via a bending, in such a way as to become narrower and to penetrate into the opening 8. The folding can be carried out by a tooling with suction such as that which is shown. The low thickness of the cover 5 (1 mm or a few mm for example) allow for this elastic folding.

Figure 9:
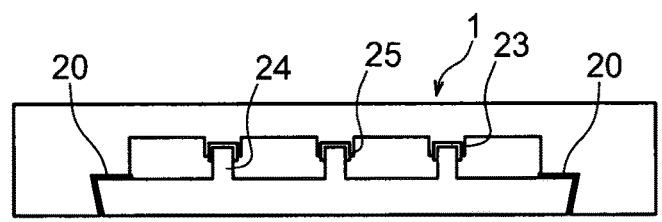
FIG. 9, another alternative embodiment.

It has been mentioned that one of the main advantages of the invention was the possibility of not using gluing or any other intermediate connection material between the main portion 1 and the cover 5 in order to maintain the assembly. A complementary gluing can however be carried out if for example an additional guarantee is sought against the appearance of vibrations of the cover 5 during operation. As this gluing is not required for the cohesion of the vane, it can be accomplished with fewer conditions: the excess glue is as such not necessary, with discontinuities in gluing on the edge being admissible, and the conventional step of reworking the surface in order to smooth it out after gluing disappears. FIG. 9 shows that glued portions 20 can be added for example at the bottom of the widenings 10 or 17, or at other locations of contact between the main portion 1 and the cover 5, which can be located at stiffeners 23 or 24 that are provided on the main portion 1 or the cover 5. These two types of stiffeners 23 and 24 are both present, and opposite one another, in the embodiment of FIG. 9, and glued portions 25 extend between their ends in contact. The contacts can be flat, but the stiffeners (here 24) can also penetrate into the hollow portions established either in the stiffeners of the opposite part here 23, or directly in this opposite part if it is of sufficient thickness.

Figure 10:
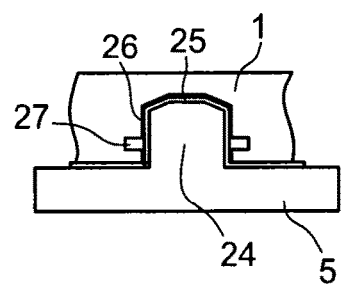
FIG. 10, a detail of another alternative.

FIG. 8 showed a design where only the stiffeners 23 of the main portion 1 exist; FIG. 10 shows a particular situation, where only the stiffeners 24 of the cover 5 exist, penetrating into the hollows 26 of the main portion 1, deep enough so that the latter is in contact with the cover 5 itself around the stiffeners 24. The contact portions around stiffeners 24 can also correspond to other portions of gluing 25. A groove 27 in the hollows 26 has been shown, which is used to receive the excess glue in case of need.

The cohesion between the main portion and the cover 5 can be explained simply by clearances that are sufficiently small between them. It can be confirmed if for example a plugging paste or an O-ring not shown is arranged in the widening 10 or 17 in order to form a continuous connection with the cover 5.

Figure 11:
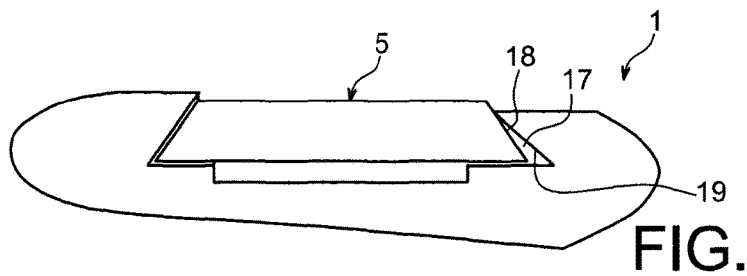
FIGS. 11, 12 and 13, three another alternative embodiments.

In the case of external 18 and 19 oblique edges, it is recommended that they be provided with a slope such that the angle that they form with the direction ZZ perpendicular to the external face 7 or 9, is chosen from 1° to 45°, and preferably in the lower region of this range, from 1 to about 5°. As shown in FIG. 11, the external faces 18 and 19 do not necessarily have the same slope, and the oblique edge 19 of the widening 17 of the main portion 1 can be larger, at least on one side of the opening 8, in order to facilitate the introduction of the cover 5 into the widening 17 and to maintain it at the bottom of the latter. The difference between the slopes is very little and it has been exaggerated in the figure.

Figure 12:
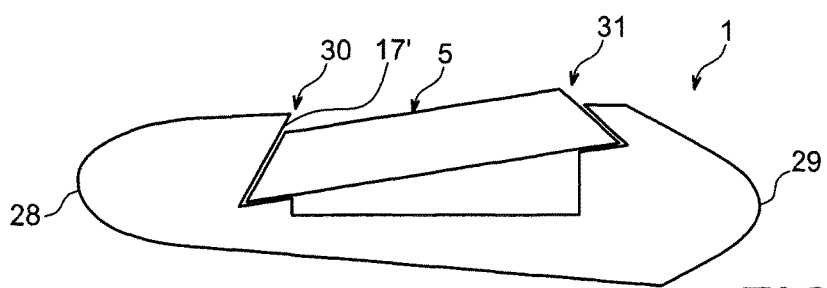
Figure 13:
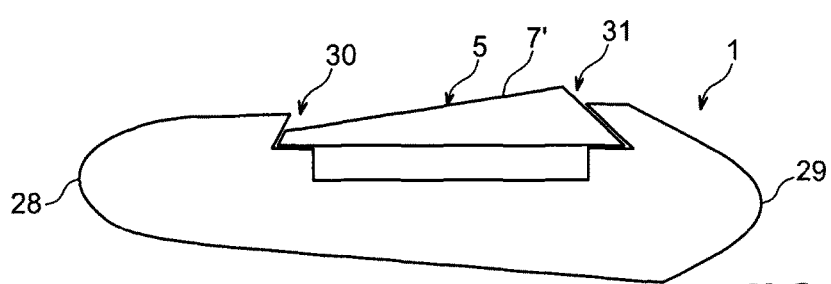

A perfect continuity of the external faces 7 and 9 would be ideal when the assembly is finished, but on an imperfect connection can be considered which does not compromise the aerodynamic performance of the vane. FIGS. 12 and 13 show two alternatives of a design considered, wherein the cover 5 is retractable in the opening 8 near a leading edge 28 of the vane, but protruding near an opposite trailing edge 29. The changes in elevation at these locations between the external faces 7 and 9 can be of a few tenths of millimetres. They can be obtained, in the case of FIG. 12, by a widening 17' of which the depth decreases towards the trailing edge 29 or, as shown in FIG. 13, by a cover 5 of which the external face 7' is oblique in relation to the lower face, in such a way that the cover 5 has a decreasing thickness towards the leading edge 28. Here also these irregularities in depth and thickness have been exaggerated for the purposes of better comprehension.

Figure 14:
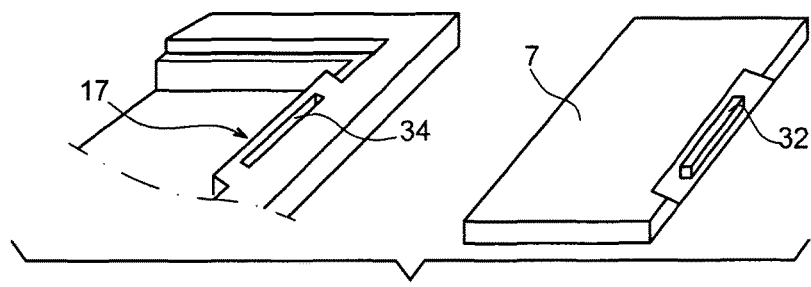
FIGS. 14 and 15, another alternative embodiment.
Figure 15:
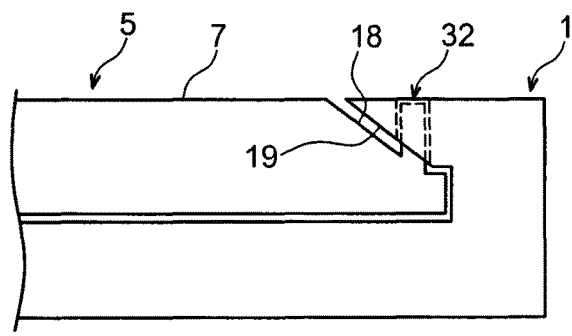
Figure 16:
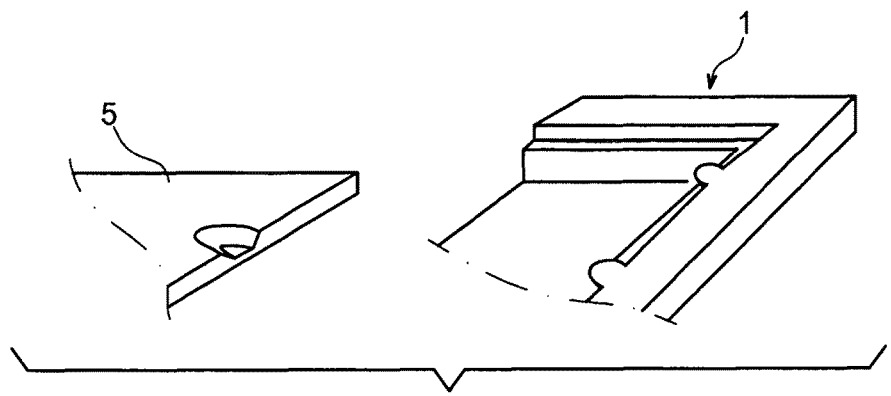
FIGS. 16 and 17, two other alternative embodiments.

AS has been said, the protrusions and widenings can extends over all of the edges of the main part 1 and of the cover 5, or over only portions that can be superimposed of these edges, for example only on two opposite sides, as for example the sides 30 and 31 respectively close to the leading edge 28 and to the trailing edge 29 such as is shown in the designs of FIGS. 12 and 13. They can also extend only over segments of this edge or of these sides, as shown in FIGS. 14 and 15. In addition, the vane can have anchoring 32 that reinforce its cohesion and consistent here in a protruding edge established on the oblique edge 18 of the cover 5 and which penetrate into a recess 34 of a complementary shape that opens into the oblique edge 19 of the main portion 1. The protrusions and widenings can possibly be of very small width. Their lateral ends can be straight, as has been shown in FIG. 14, or rounded as is shown in FIG. 16.

Figure 17:
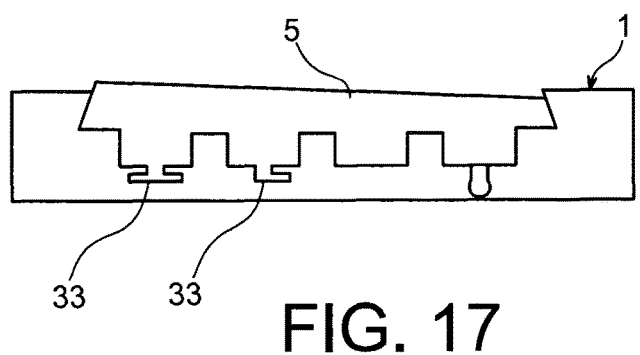

The hollow region of the main portion 1 can be occupied by a layer or a block of a bee's nest or of foam under the cover 5 so that the latter bears on this layer over the entire surface. A design wherein the same result is achieved and wherein other remarkable particularities are present is shown by means of FIG. 17. The cover 5 also occupies the entire hollow of the main portion 1, in addition it carries out with it nestings of anchoring 33 at the bottom of this hollow region. These anchoring 33 can correspond to protruding portions of the cover 5 spreading or sagging in corresponding hollows of the main portion 1. Such a structure can be produced by a particular method, the cover 5 being for made of a thermoplastic or thermosetting polymer: its material is moulded by injection in the hollow region, then pressed in the hollow region of the main portion 1 in such a way as to occupy it entirely, before it is set to harden. A vent can then be provided through the vane in order to remove the gas released and to prevent it from accumulating in the cavity. This vent is a hole that is later filled in. It is more preferably made by opening into a home region of a support of the latter.

The invention claimed is:
1. A hollow vane comprising:
a main portion; and
a cover, the cover being mounted in an opening of the main portion in such a way as to close the opening and to form with the main portion an external, substantially continuous face of the vane,
wherein the main portion comprises a cavity that communicates with the external face via the opening, wherein the cover comprises a protrusion, extending over a portion of a thickness of the cover at a distance from the external face, and over an edge of the cover, wherein the main portion comprises a widening of the opening, located at a distance from the external face and in which the protrusion of the cover penetrates, and wherein the opening of the main portion comprises a bottom face which is a bearing face for an internal face of the cover.

2. The hollow vane according to claim 1, wherein the cover is mounted without clearance in the opening of the main portion between the protrusion and the external face, and the protrusion is housed in the widening with clearance.

3. The hollow vane according to claim 1, wherein the cover is attached to the main portion without any intermediate material.

4. The hollow vane according to claim 1, wherein the protrusion and the widening extend either over complete edges of the opening and of the cover, or over portions that can be superimposed of said edges.

5. The hollow vane according to claim 1, wherein the protrusion and the widening extend in front of leading and trailing edges of the vane, the cover protruding outside of the main portion in front of the leading edge and retracting in the main portion in front of the leading edge, by a decreasing thickness from the cover from the leading edge to the trailing edge, or by a decreasing depth of the widening from the leading edge to the trailing edge.

6. The hollow vane according to claim 1, wherein the opening and the cover are limited, at the protrusion and at the widening, by oblique edges which have sections that continuously widen from the external face of the vane.

7. The hollow vane according to claim 6, wherein said oblique edges form lower angles with directions perpendicular to the external face of the vane.

8. The hollow vane according to claim 7, wherein said oblique edges form lower angles 5° with the directions perpendicular to the external face of the vane.

9. The hollow vane according to claim 6, wherein said oblique edges of the opening and of the cover form different angles with directions perpendicular to the external face of the vane, at least to one of the sides of the opening.

10. The hollow vane according to claim 1, wherein the cover fully occupies the opening of the main portion, is connected to the main portion by nested anchoring, and is produced by molding in the opening.

11. A method of producing a hollow vane, the vane comprising a main portion and a cover, the cover being mounted in an opening of the main portion in such a way as to close the opening and to form with the main portion an external, substantially continuous face of the vane, the main portion further comprising a cavity that communicates with the external face via the opening, and the cover comprises a protrusion, extending over a portion of a thickness of the cover at a distance from the external face, and over an edge of the cover, and the main portion comprises a widening of the opening, located at a distance from the external face and in which the protrusion of the cover penetrates, the method comprising:

dilating the main portion of the vane relative to the cover due to a difference in temperature between the main portion and the cover, the difference in temperature being created by at least one of a heating of the main portion and a cooling of the cover;

introducing the cover into the opening without the protrusion penetrating into the widening; and stopping the dilating of the main portion of the vane in order to allow the main portion of the vane to retract on the cover and to allow the widening to adjust around the protrusion.

* * * * *